US011226090B2

(12) United States Patent
Milton et al.

(10) Patent No.: US 11,226,090 B2
(45) Date of Patent: Jan. 18, 2022

(54) DEVICE AND APPARATUS FOR HORTICULTURAL LIGHTING AND VENTILATION

(71) Applicants: Schuyler David Milton, Vienna, VA (US); Keith Thomas Born, Bowie, MD (US)

(72) Inventors: Schuyler David Milton, Vienna, VA (US); Keith Thomas Born, Bowie, MD (US)

(*) Notice: Subject to any disclaimer, the term of this patent is extended or adjusted under 35 U.S.C. 154(b) by 63 days.

(21) Appl. No.: 16/944,700

(22) Filed: Jul. 31, 2020

(65) Prior Publication Data

US 2021/0033271 A1  Feb. 4, 2021

Related U.S. Application Data

(60) Provisional application No. 62/881,800, filed on Aug. 1, 2019.

(51) Int. Cl.
| | | |
|---|---|---|
| *F21V 29/00* | (2015.01) | |
| *F21V 29/67* | (2015.01) | |
| *F21V 33/00* | (2006.01) | |
| *F21S 4/28* | (2016.01) | |
| *H05B 47/16* | (2020.01) | |
| *H05B 45/10* | (2020.01) | |
| *A01G 9/24* | (2006.01) | |
| *A01G 31/02* | (2006.01) | |
| *F21Y 115/10* | (2016.01) | |
| *F21W 131/109* | (2006.01) | |

(52) U.S. Cl.
CPC .............. *F21V 29/67* (2015.01); *A01G 9/247* (2013.01); *A01G 31/02* (2013.01); *F21S 4/28* (2016.01); *F21V 33/0096* (2013.01); *H05B 45/10* (2020.01); *H05B 47/16* (2020.01); *F21W 2131/109* (2013.01); *F21Y 2115/10* (2016.08)

(58) Field of Classification Search
CPC .......... A01G 7/045; A01G 9/247; A01G 9/26; H05B 47/16; H05B 45/10; F21V 29/67; F21V 33/0096; F21S 4/28
See application file for complete search history.

(56) References Cited

U.S. PATENT DOCUMENTS

| 7,815,327 B2 | 10/2010 | Shamshoian |
| 9,404,648 B2 | 8/2016 | Druchinin |
| 9,750,199 B2 | 9/2017 | Stanley |
| 10,798,879 B1* | 10/2020 | Graves .................. A01G 7/045 |

(Continued)

FOREIGN PATENT DOCUMENTS

| EP | 2348814 B1 | 3/2011 | |
| EP | 2348814 B1 * | 4/2015 | ............... A01G 7/02 |

(Continued)

*Primary Examiner* — Gerald J Sufleta, II

(57) ABSTRACT

A device and apparatus to provide lighting and ventilation for horticultural applications. The invention relates to a device that combines lighting and ventilation into a single device that enables more efficient lighting and ventilation, and thereby greater control of the microclimate for high density indoor horticulture and controlled environment agriculture. The invention further relates to an apparatus comprised of an array of the devices and the networked control thereof.

17 Claims, 4 Drawing Sheets
(2 of 4 Drawing Sheet(s) Filed in Color)

(56) References Cited

U.S. PATENT DOCUMENTS

| | | | |
|---|---|---|---|
| 2012/0020071 A1* | 1/2012 | McKenzie | A01G 9/249 362/231 |
| 2015/0023022 A1 | 1/2015 | Stanley | |
| 2016/0165821 A1* | 6/2016 | Fujiyama | A01G 31/02 47/60 |
| 2016/0360712 A1 | 12/2016 | Yorio et al. | |
| 2017/0265408 A1* | 9/2017 | McGowan | A01G 31/02 |
| 2018/0014485 A1* | 1/2018 | Whitcher | A01G 31/06 |
| 2018/0110102 A1* | 4/2018 | Adams | A01G 9/20 |
| 2018/0263195 A1* | 9/2018 | Hutto | A01G 22/00 |
| 2019/0021233 A1* | 1/2019 | Hamby | G01J 1/32 |
| 2019/0259108 A1* | 8/2019 | Bongartz | A01C 21/005 |
| 2020/0260673 A1* | 8/2020 | Travaglini | A01G 7/045 |
| 2020/0396907 A1* | 12/2020 | Li | A01G 9/20 |
| 2021/0112727 A1* | 4/2021 | Nicole | A01G 9/249 |
| 2021/0127593 A1* | 5/2021 | Krijn | H05B 47/105 |
| 2021/0204484 A1* | 7/2021 | Aykroyd | A01G 9/249 |
| 2021/0219497 A1* | 7/2021 | Li | F21K 9/20 |
| 2021/0307269 A1* | 10/2021 | Massey | A01G 31/06 |

FOREIGN PATENT DOCUMENTS

| | | | |
|---|---|---|---|
| KR | 100959994 B1 * | 5/2010 | |
| KR | 100959994 B1 | 5/2010 | |

\* cited by examiner

DEVICE AND APPARATUS FOR HORTICULTURAL LIGHTING AND VENTILATION

FIELD OF THE INVENTION

The present invention relates to novel devices and apparatus for growing crops with horticultural lighting and ventilation. Specifically, the invention relates to a device and apparatus to provide, in combination, lighting and ventilation to plants grown in controlled environments. The device is applicable to a series of apparatus to grow crops in a variety of orientations such as horizontal, vertical and angled in any controlled environment agricultural application.

BACKGROUND OF THE INVENTION

High density indoor horticulture and controlled environment agriculture (CEA) are methods of growing plants whereby the practitioner exerts direct control over one or more environmental component, including lighting, ventilation, temperature, $CO_2$ concentration, humidity, irrigation and fertilization. Often, CEA is practiced in tandem with hydroponics, a field of agriculture that encompasses growing crops using nutrient rich water. Hydroponics includes various subsets, specifically, aeroponics, deep water culture (DWC), nutrient film technique (NFT) and flood-drain systems.

Critical components of high density horticulture and CEA addressed by the present invention are lighting and ventilation. Lighting is the means by which plants absorb photosynthetic energy. Ventilation is also critically important for plant growth to ensure delivery of fresh air, $CO_2$, and the control of humidity.

High density indoor horticulture and (CEA) both require precise control of the microenvironment to mitigate crop damage that can arise with high concentrations of light, heat and/or humidity. High density indoor horticulture and CEA have come to rely on LEDs for most applications, however in most instances each application inevitably wastes a considerable amount of energy in two ways. First, less than 100% of the photosynthetically active radiation actually falls on the crops, lighting the surrounding area instead, to no economic benefit. Second, high power LEDs placed at a distance greater than two feet from the crops produce a considerable amount of waste heat, which must be removed from the system requiring additional cost in utilities. High power LEDs (with individual chip output greater than or equal to 3 watts) cannot be used close to plants because the heat and high concentration of photons will damage crops. Lower power LEDs can be used closer to crops without causing damage to the crops, but when crops and LEDs are both used at high density both the LEDs and crops can both be damaged without adequate ventilation.

SUMMARY OF THE INVENTION

The present invention relates to novel devices and apparatus for growing crops with horticultural lighting and ventilation. The device serves two primary functions; (1) illuminating plants, and (2) circulating air. Embodiments of the device comprise a variety of forms which are specific to the particular application in which the device may be used. In all forms, the device comprises a tube to which a plurality of light emitting diodes (LEDs) are attached, and the device further comprises a plurality of holes along the surface of the tube through which circulated air may flow. The device may further be used in an array of similar or identical devices comprising, together, an apparatus. The device or apparatus may further be networked such that each device, groups of devices within the array, or the entire array may be controlled remotely.

BRIEF DESCRIPTION OF THE DRAWINGS

The patent or application file contains at least one drawing and/or photograph executed in color. Copies of this patent or patent application publication with color drawing(s) will be provided by the Office upon request and payment of the necessary fee.

DETAILED DESCRIPTION OF THE INVENTION

The combination of LEDs and a ventilation unit solves a critical problem in the horticulture industry, which is the need to use LED lighting efficiently at very high density. Bringing the LED lights closer to the crops increases the lighting efficiency of the system and therefore the economic benefit of the system. Ventilation of high density indoor horticulture systems is a persistent problem since high density invariable means reducing surrounding air volume. Similarly, deploying LEDs close to plants (within two feet) can result in damage to the plants. Further, inadequate ventilation can result in damage to the LEDs and associate hardware due to overheating and high humidity. The present invention solves the problem of higher density applications of LEDs and allows for the use of more efficient use of LEDs in high density indoor horticulture and CEA.

Figure 1:
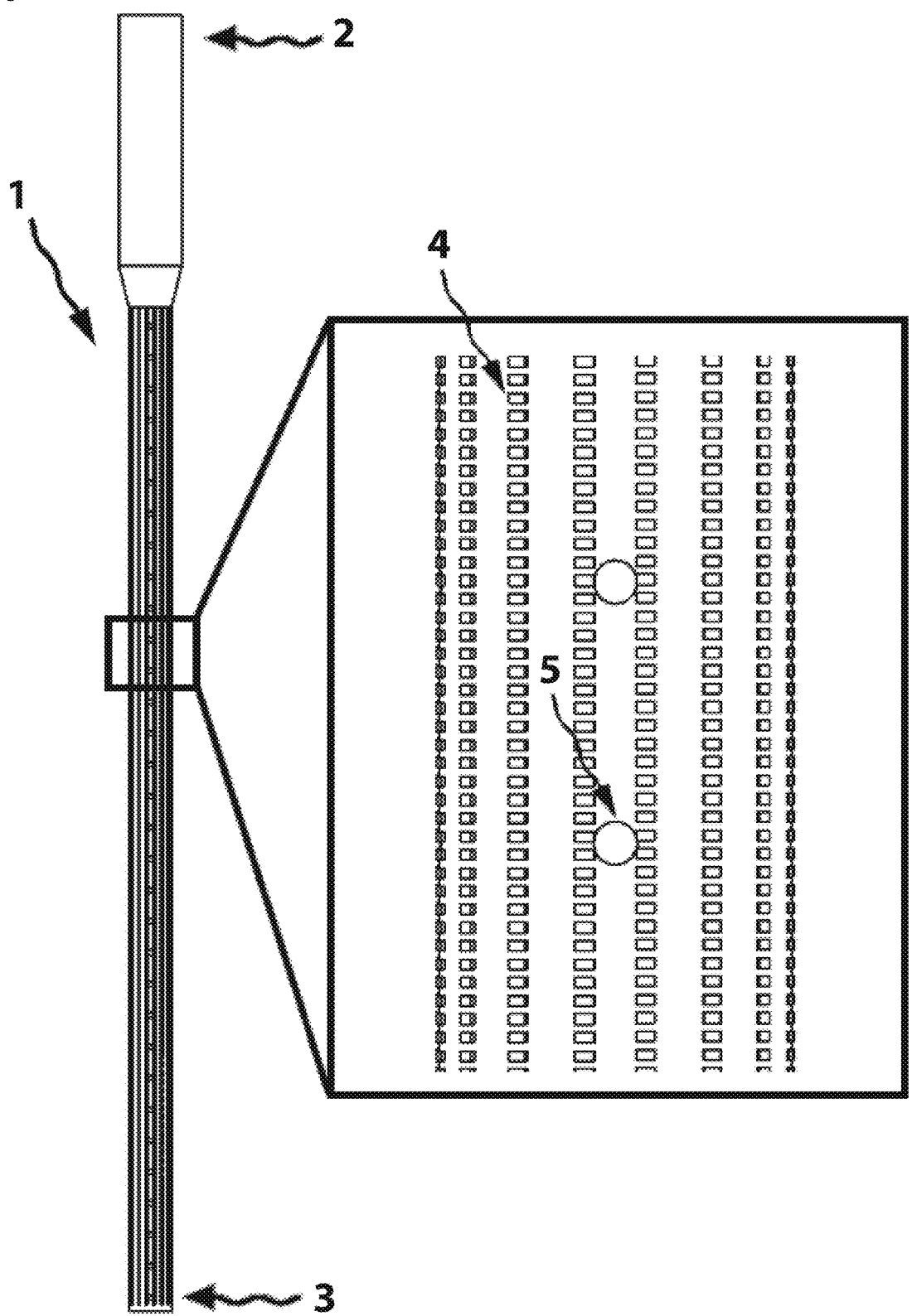
FIG. 1 shows the profile of one embodiment of the invention in which the tube is circular 1, fresh air enters through the open end of the tube 2, and fresh air exits through the plurality of holes on the surface of the tube 5. The tube is covered with a plurality of LEDs 4, providing light at the appropriate intensity and density evenly along the surface of the tube as required by the application. The opposite end of the tube is closed 3 to prevent fresh air from traveling through the tube without exiting through the plurality of holes 5.
Figure 2:
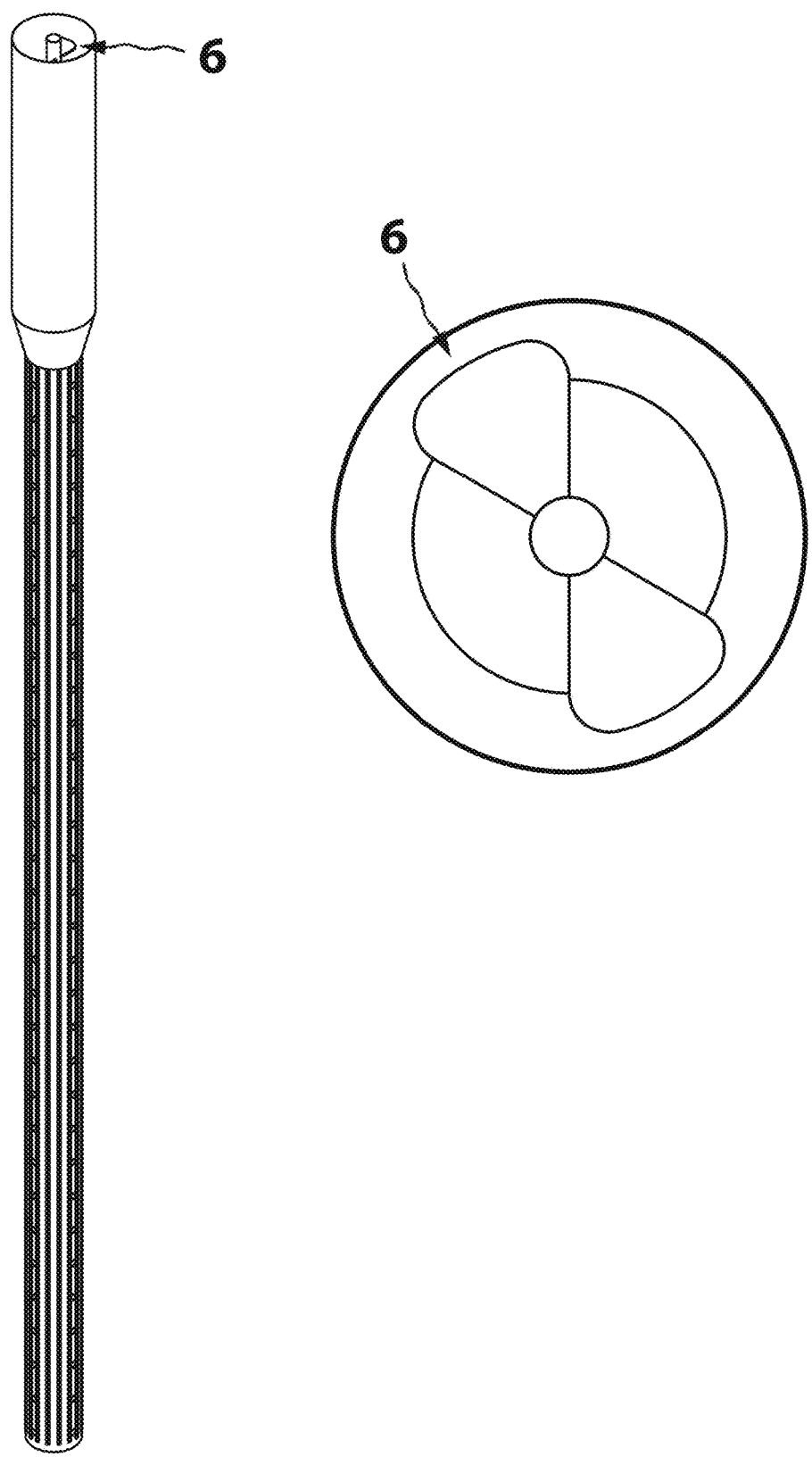
FIG. 2 shows another angle of a circular tube from the open end wherein a duct fan 6 has been placed into the open end of the tube to force fresh air into the tube.

In a preferred embodiment of the invention, the device, FIG. 1-2, is comprised of a tube, with one end open and the opposing end closed, wherein the tube is connected on the open end to a source of forced air. The tube may have a cross-sectional shape of a circle, oval, triangle, square, rectangle, or other polygon as the application requires. The source of forced air may be a fan directly affixed to the device, or may be connected through ducting to a central source of forced air such as an air handling unit. The tube has a plurality of holes on the surface such that air forced into the tube is able to exit through the plurality of holes. Each of the holes on the surface of the tube should have a cross-sectional area smaller than that of the open end of the tube. Light emitting diodes (herein, "LEDs") attached to the outside of the tube are place at regular intervals and on the appropriate sides or angles of the tube to provide light as required by the specific horticultural application. The plurality of holes serves a dual purpose, the primary function of providing ventilation to the surrounding area, and the additional function of cooling the LEDs attached to the tube which prevents the LEDs from damage due to overheating. The tube itself also serves as a heat sink for the LEDs attached to the tube.

According to an embodiment of the invention, the airflow supplied to the open end of the tube is sufficient to supply at least 0.1 cubic feet per minute (CFM), 1 CFM and/or 10 CFM of air as measured at the opening of one or more of the holes in the surface of the tube.

According to an embodiment of the invention, the individual LEDs each have a power output of less than 0.5 watts, 1 watt and/or 5 watts.

According to an embodiment of the invention the tube is made of metal. Metals appropriate for the application include, but are not limited to, galvanized steel, stainless steel, tin and aluminum.

Figure 3:
FIG. 3 shows and apparatus comprising many of the devices from FIG. 1 applied to growing plants in a vertical plane. Each device of the apparatus is placed at regular intervals in the array to provide even coverage of light and ventilation to the crops being grown.

According to an embodiment of the invention, LEDs may be absent on sides of the tube that are not facing plants as required by the application. As seen in FIG. 3, the tubes of the devices shown in the array lack LEDs on the outward facing sides, and have LEDs evenly placed on the crop-facing sides.

According to an embodiment of the invention, LEDs may be present on all sides of the tube. As pictured in FIG. 4, LEDs are evenly place on all sides of the tube because crops are being grown on all sides of the device, therefore lighting is required on all sides.

According to an embodiment of the invention, LEDs are attached in a density sufficient to supply photosynthetically active radiation of at least 200 µmol/m$^2$/s at a distance of 1 inch from a surface of the tube, at a distance of 6 inches from a surface of the tube, at a distance of 12 inches from a surface of the tube, and/or at a distance of 24 inches from a surface of the tube.

According to an embodiment of the invention, the LEDs attached to the tube are dimmable.

According to an embodiment of the invention, the LEDs attached to the tube are dimmed or modulated using pulse width modulation (PWM) or constant current reduction (CCR).

According to an embodiment of the invention, the modulation of the LEDs takes place using a network enabling remote control of the modulation.

According to an embodiment of the invention, the LEDs may be attached to the tube with adhesives such as glue or tape, or the LEDs may be attached using mechanical means such as brackets or plastic ties. The LEDs may also be attached using a combination of any of the above.

Figure 4:
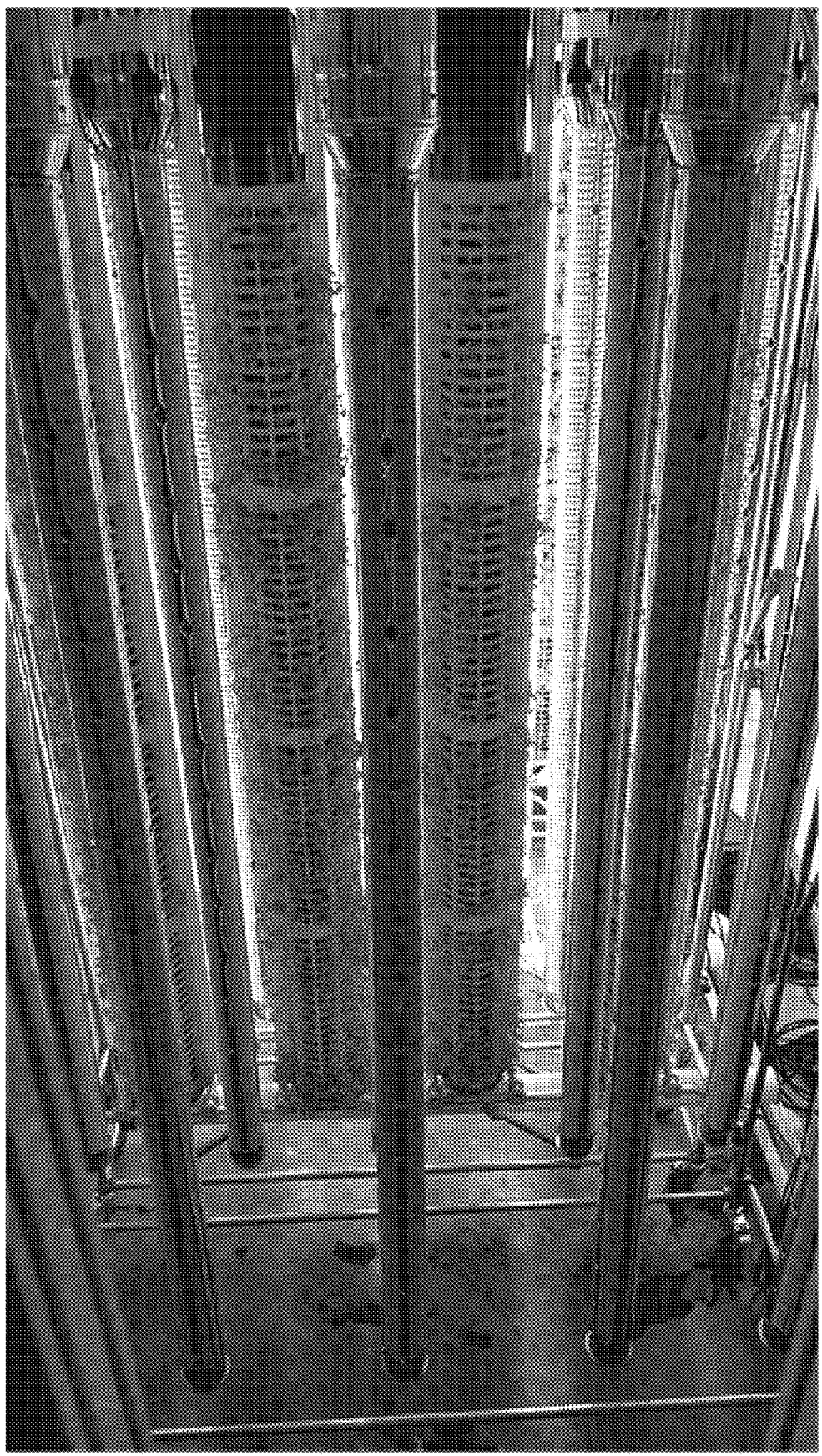
FIG. 4 shows a different angle of the apparatus pictured in FIG. 3, showing how the device is deployed in the array of the apparatus, and showing how the LEDs (pink as pictured) are evenly dispersed along the surface of the tubes.

According to an embodiment of the invention, the device is assembled into an apparatus comprising an array of similar or identical devices to provide light and ventilation to an array of crops, FIG. 3-4.

According to an embodiment of the invention, the device, or apparatus comprising multiple devices, is mobile, allowing the device to be repositioned relative to the crop-growing apparatus it is being used with. The mobility may come from being attached to wheels on the bottom, as pictured in FIG. 3-4. The mobility may also come from being attached to rails suspending the devices which can be adjusted horizontally or vertically as the application requires.

The forgoing embodiments are presented by way of example only; the scope of the present invention is to be limited only by the following claims.

What is claimed is:

1. A device for illuminating plants and circulating air, comprising:
    a hollow body,
    wherein the hollow body comprises at least one opening,
    wherein the opening(s) is/are connected to at least one source of forced air,
    wherein a surface of the hollow body comprises a plurality of holes,
    wherein at least some of the forced air supplied to the hollow body through the opening(s) exits the hollow body through one or more of the holes,
    wherein a plurality of light emitting diodes (herein "LEDs") are attached to an outside surface of the hollow body,
    wherein the LEDs are attached in a density sufficient to supply photosynthetically active radiation of at least 200 µmol/m$^2$/s is at a distance of 1 inch from a surface of the hollow body,
    and wherein at least a portion of the holes are on the same surface of the hollow body as the LEDs such that at least a portion of the forced air that exits the hollow body through said portion of the holes does so substantially parallel to the direction of the photosynthetically active radiation supplied by the LEDs.

2. The device of claim 1, wherein the source(s) of forced air are selection from the group consisting of a fan and a central air handling unit.

3. The device of claim 1, wherein the LEDs are attached in a density sufficient to supply photosynthetically active radiation of at least 200 µmol/m$^2$/s at a distance of 1$ inches from the surface of the hollow body.

4. The device of claim 1, wherein the LEDs are attached in a density sufficient to supply photosynthetically active radiation of at least 200 µmol/m$^2$/s at a distance of 24 inches from the surface of the hollow body.

5. The device of claim 1, wherein the LEDs are attached in a density sufficient to supply photosynthetically active radiation of at least 200 µmol/m$^2$/s at a distance of 48 inches from the surface of the hollow body.

6. The device of claim 1, wherein the LEDs are attached in a density sufficient to supply photosynthetically active radiation in a density of at least 200 µmol/m$^2$/s at a distance of 96 inches from the surface of the hollow body.

7. The device of claim 1, wherein the LEDs are dimmable.

8. The device of claim 1, wherein the LEDs are connected to a timer controlling the on or off state of the LEDs.

9. The device according to claim 7, wherein the LEDs are connected to a network capable of controlling the dimming remotely.

10. The device according to claim 8, wherein the LEDs are connected to a network capable of controlling the on or off state remotely.

11. The device according to claim 1, wherein the forced air supplied to the opening of the hollow body is sufficient to supply at least 1 cubic feet per minute of air though the cross-sectional area of one or more of the holes.

12. The device according to claim 1, wherein the forced air supplied to the opening of the hollow body is sufficient to supply at least 10 cubic feet per minute of air though the cross-sectional area of one or more of the holes.

13. The device according to claim 1, wherein the forced air supplied to the opening of the hollow body is sufficient to supply at least 50 cubic feet per minute of air though the cross-sectional area of one or more of the holes.

14. The device according to claim 3, wherein the individual LEDs each have a power output of less than 0.5 watts.

15. The device according to claim 3, wherein the individual LEDs each have a power output of less than 1 watt.

16. The device according to claim 3, wherein the individual LEDs each have a power output of less than 5 watts.

17. An apparatus comprising an array of two or more of the devices according to claim 1.

* * * * *